Nov. 16, 1948.　　　　J. PATRICK　　　　2,454,085
JUICER WITH HAND RECIPROCATED ROTARY REAMER
Filed April 28, 1945
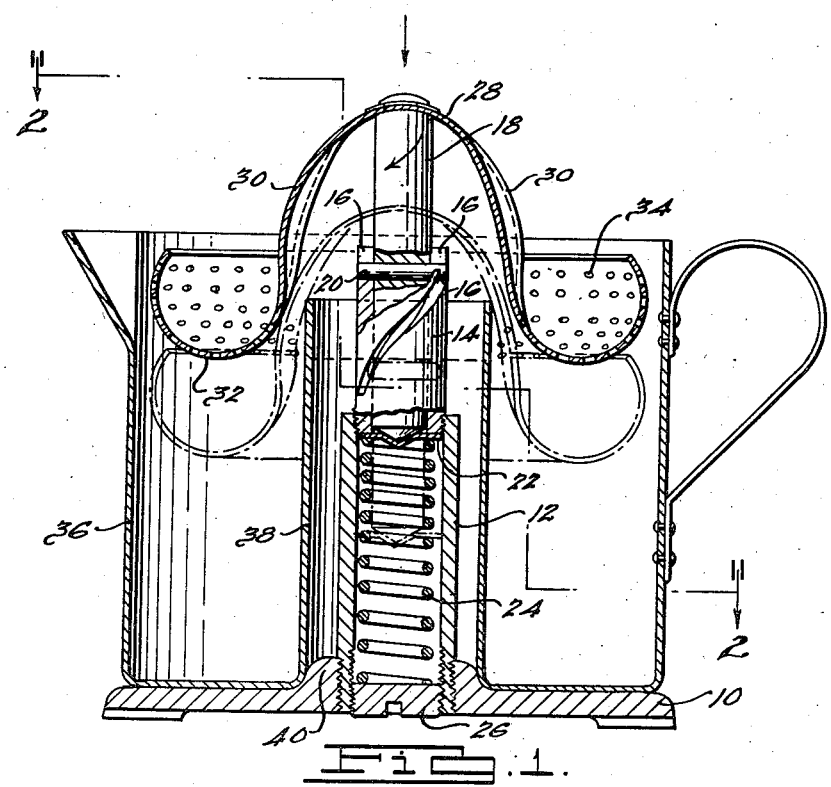
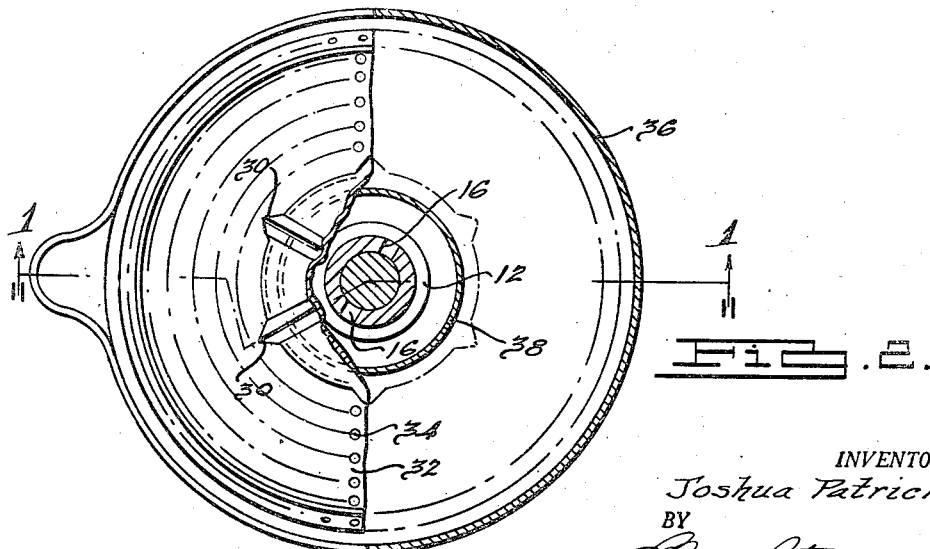
INVENTOR.
Joshua Patrick.
BY
ATTORNEY.

Patented Nov. 16, 1948

2,454,085

UNITED STATES PATENT OFFICE 2,454,085

JUICER WITH HAND RECIPROCATED ROTARY REAMER

Joshua Patrick, Detroit, Mich.

Application April 28, 1945, Serial No. 590,818

1 Claim. (Cl. 146—3)

This invention relates to a fruit juice extractor and is illustrated as embodied in a portable and manually operable device.

An object of the invention is to provide an oscillatory serrated head adapted to be forcibly received in the pulp and juice portion of a half fruit held by the operator and to provide means for causing oscillation of the head by a reciprocating movement thereof.

Another object of the invention is to provide oscillatory perforated strainer means associated with the head for causing a swashing of the extracted pulp portion from the fruit collected therein, to free the perforations and thereby permit a free flow of juice therethrough.

A further object of the invention is to provide a stationary receptacle surrounding the oscillating head for collecting the juice after it leaves the strainer and one which may be readily disassociated from a portion of the mechanism for pouring the juice from the receptacle without removal of the strainer and serrated head from the receptacle.

Other objects and advantages of the invention will more fully appear from the following description taken in connection with the accompanying drawings in which—

Fig. 1 is a sectional view of the juice extractor taken on line 1—1 of Fig. 2; and Fig. 2 is a plan view of Fig. 1, partly in elevation and partly in section, taken on line 2—2 of Fig. 1.

In the form of the device selected for illustrating the invention, I have shown a base 10 into which is screw-threaded one end of a sleeve 12. The opposite end of the sleeve 12 is internally threaded and receives one end of a threaded tubular guide member 14. The guide member 14 is provided with a pair of oppositely disposed spiral slots 16. Each slot has a convolution of substantially 180° extending from a point above the threaded end of the tubular guide through the opposite end.

A rod 18 is slidably mounted in the guide 14 and has a pin 20, longer than the diameter of the rod, extended therethrough and projecting into the slots 16. The rod 18 is supported for pivotal movement on depressed washer 22 which is positioned against the end of the bushing 14. The lower end of the rod 18 is conical to fit the depression in the washer and the washer is held in place by a compression spring 24. The spring is held under compression by a screw-threaded plug 26 which is adjustable to alter the compression on the spring.

At the upper end of the rod 18, there is riveted or otherwise secured, a conical extractor head 28 having a plurality of circumferentially spaced V-shaped projections 30. The lower edge of the head 28 is provided with a circumferential flange 32 which is semi-circular in cross section and is provided with a plurality of apertures 34 through which the fruit juice drains.

A receptacle 36 in the form of a cup has a centrally located sleeve portion 38 which fits within the hollow of the head 28. The sleeve 38 is open at its opposite ends and fits over a locating raised portion 45 of the base 10. The outer wall of the cup 36 projects above the upper edge of the flange 32 and the annular space between the outer wall of the cup 36 and sleeve 38 collects the fruit juice as it drains through the apertures in the flange 32.

The device is shown in full lines in its raised position to receive a half fruit. The fruit is placed over the pointed head 28 and downward pressure is applied. This pressure causes movement of the head 28 and rod 18 against the spring pressure and the pin 20, riding in the slots 16, causes oscillation of the head 28 and the relative movement between the fruit, which is held by the operator, causes the projections 30 to break the cellular structure of the fruit extracting the juice. The pulp and juice are centrifugally thrown to the outer edge of the flange 32 where the juice drains through the openings 34 into the receptacle 36. The pulp remains in the curved flange 32 and its swashing action, caused by the oscillation of the head 28, keeps the openings 34 from becoming closed.

After sufficient juice has been collected in the receptacle 36, the receptacle is removed from its base. The head 28 and rod 18 may be previously removed or it may be removed by the operation of removing the receptacle when the upper edge of the sleeve 38 engages the under surface of the head 28. Since the head is normally in its upper position, the pin 20 is at the open end of the slots 16, it is easily removed from the guide member 14.

The device is inexpensive to manufacture, easily assembled and the operating mechanism unexposed to the fruit juices so that the structure is easily cleaned after use.

It will be understood that various changes including the size, shape and arrangement of parts may be made without departing from the spirit of my invention and it is not my intention to limit its scope other than by the terms of the appended claim.

I claim:

A juice extractor comprising a base, a central tubular member projecting upwardly from the face of said base, a sleeve carried in the upper open end of said tubular member, an adjustable closure member for the lower open end of said tubular member, said sleeve having a spiral slot in the wall thereof extending through the upper open end of said sleeve, a rod slidably mounted in said sleeve, a pin carried by said rod received in the slot of said sleeve, resilient compression means between the lower end of said rod and said adjustable closure member, a conically shaped ribbed head carried at the upper end of said rod, said head having a semi-circular flange at its outer edge and provided with a plurality of apertures, and a removable receptacle on said base having an open ended sleeve portion surrounding said tubular member extending from said base to within the semi-circular portion of said head and having an outer sleeve portion extending from said base above the semi-circular portion of said head having its lower end integrally connected through a base portion to the lower end of the sleeve portion of said receptacle.

JOSHUA PATRICK.

REFERENCES CITED

The following references are of record in the file of this patent:

UNITED STATES PATENTS

| Number | Name | Date |
| --- | --- | --- |
| 1,634,774 | Enssle | July 5, 1927 |
| 1,855,341 | Deleray | Apr. 26, 1932 |
| 1,933,738 | Kazoian | Nov. 7, 1933 |
| 1,956,288 | Herman | Apr. 24, 1934 |
| 1,969,006 | Herman | Aug. 7, 1934 |